(12) United States Patent
Harris (10) Patent No.: US 9,531,246 B2
(45) Date of Patent: Dec. 27, 2016

(54) BI-ROTATIONAL GENERATOR

(71) Applicant: Grover Curtis Harris, Norman, OK (US)

(72) Inventor: Grover Curtis Harris, Norman, OK (US)

(*) Notice: Subject to any disclaimer, the term of this patent is extended or adjusted under 35 U.S.C. 154(b) by 0 days.

(21) Appl. No.: 14/749,486

(22) Filed: Jun. 24, 2015

(65) Prior Publication Data

US 2015/0295481 A1  Oct. 15, 2015

Related U.S. Application Data

(63) Continuation-in-part of application No. 14/138,665, filed on Dec. 23, 2013.

(51) Int. Cl.
| | |
|---|---|
| *F03D 1/00* | (2006.01) |
| *H02K 16/00* | (2006.01) |
| *F01D 15/10* | (2006.01) |
| *F01D 7/00* | (2006.01) |
| *B60R 16/03* | (2006.01) |
| *F03B 13/10* | (2006.01) |
| *F03B 15/06* | (2006.01) |
| *F03B 17/06* | (2006.01) |

(52) U.S. Cl.
CPC ......... *H02K 16/005* (2013.01); *B60R 16/0307* (2013.01); *F01D 7/00* (2013.01); *F01D 15/10* (2013.01); *F03B 13/105* (2013.01); *F03B 15/06* (2013.01); *F03B 17/061* (2013.01); *F05B 2220/7068* (2013.01); *F05B 2240/13* (2013.01); *F05B 2260/74* (2013.01); *F05B 2260/76* (2013.01); *Y02E 10/22* (2013.01); *Y02E 10/226* (2013.01); *Y02E 10/28* (2013.01)

(58) Field of Classification Search
CPC ........................................................ F03D 1/00
USPC ............................................................. 290/54
See application file for complete search history.

(56) References Cited

U.S. PATENT DOCUMENTS

| | | | | |
|---|---|---|---|---|
| 2,501,696 | A | * 3/1950 | Souczek | F03B 17/061 290/43 |
| 2,941,613 | A | * 6/1960 | Di Perna | B60K 16/00 180/2.2 |
| 2,949,540 | A | * 8/1960 | Clayton | F03B 13/083 290/4 R |
| 4,632,205 | A | * 12/1986 | Lewis | B60K 6/48 180/165 |

(Continued)

FOREIGN PATENT DOCUMENTS

| | | | |
|---|---|---|---|
| JP | 09324736 | A * | 12/1997 |
| JP | 2012107535 | A * | 6/2012 |
| RU | 1787205 | A3 * | 1/1993 |

*Primary Examiner* — Joseph Waks
(74) *Attorney, Agent, or Firm* — Crowe & Dunlevy, P.C.

(57) ABSTRACT

A fluid-driven electricity generator includes a stator assembly and a rotor assembly. The stator assembly includes a stator core that includes a plurality of stator windings and one or more stator turbines connected to the stator core. The one or more stator turbines are configured to rotate in a first direction. The rotor assembly includes a plurality of permanent magnets that are substantially surrounded by the stator core. The rotor assembly also includes one or more rotor turbines connected to the plurality of permanent magnets. The one or more rotor turbines are configured to rotate in a second direction that is opposite the first direction.

18 Claims, 11 Drawing Sheets

(56) References Cited

U.S. PATENT DOCUMENTS

| | | | | |
|---|---|---|---|---|
| 5,760,515 | A * | 6/1998 | Burns | F03D 9/00 |
| | | | | 180/65.31 |
| 7,102,249 | B2 * | 9/2006 | Wobben | F03B 13/10 |
| | | | | 290/40 C |
| 7,218,012 | B1 * | 5/2007 | Edenfeld | F03D 7/0224 |
| | | | | 290/1 A |
| 8,098,040 | B1 * | 1/2012 | Botto | B60L 8/006 |
| | | | | 290/44 |
| 2003/0116970 | A1 * | 6/2003 | Weitkamp | F03D 7/0224 |
| | | | | 290/44 |
| 2008/0300821 | A1 * | 12/2008 | Frank | G01V 1/201 |
| | | | | 702/150 |

* cited by examiner

BI-ROTATIONAL GENERATOR

RELATED APPLICATIONS

This application is a continuation-in-part of U.S. patent application Ser. No. 14/138,665, filed Dec. 23, 2013 and entitled "Bi-Rotational Generator," the disclosure of which is herein incorporated by reference.

FIELD OF THE INVENTION

The present invention generally relates to an apparatus and system for generating electricity, and more particularly, to an apparatus and system for converting energy from a dynamic fluid flow into electricity.

BACKGROUND OF THE INVENTION

Electrical generators and alternators have been used for many years to produce electricity. An electric generator is a device that converts mechanical energy to electrical energy. A generator forces electric current to flow through an external circuit. The source of mechanical energy may be a reciprocating or turbine steam engine, water falling through a turbine or waterwheel, an internal combustion engine, a wind turbine, a hand crank, compressed air, or any other source of mechanical energy. Generators provide nearly all of the power for electric power grids.

Modern generators are often configured as alternators that include rotor and stator assemblies. The rotor assembly typically includes a series of permanent magnets that are together driven in a rotating manner by an external mechanical force. The stator assembly typically includes a series of windings or coils that surround the rotor assembly. The stator assembly remains stationary as the rotor assembly rotates. The movement of the permanent magnets in close proximity to the windings induces an electric current in the windings. The quantity and characteristics of the generated current are in part dependent on the configuration of the alternator (e.g., number of coils and magnets) and the speed at which the rotor assembly rotates. Rectifiers and other downstream components can be used to condition the output from the alternator.

In recent years, there have been increased efforts at establishing methods for producing electricity that are renewable and present minimal adverse impact to the natural environment. The use of wind-based generators has become particularly popular with the development of massive wind turbines. Although widely adopted, present generation systems are not well-suited for certain applications and are only moderately efficient in converting captured energy to electricity, and possess inherent limitations in their mechanical configuration. There furthermore remains a need for a generation system that provides enhanced efficiency and automated control. It is to these and other objects that the present invention is directed.

SUMMARY OF THE INVENTION

In preferred embodiments, the present invention includes a fluid-driven electricity generator that includes a stator assembly and a rotor assembly. The stator assembly includes a stator core that includes a plurality of stator windings and one or more stator turbines connected to the stator core. The one or more stator turbines are configured to rotate in a first direction. The rotor assembly includes a plurality of permanent magnets that are substantially surrounded by the stator core. The rotor assembly also includes one or more rotor turbines connected to the plurality of permanent magnets. The one or more rotor turbines are configured to rotate in a second direction that is opposite the first direction.

DETAILED DESCRIPTION OF PREFERRED EMBODIMENTS

Generally, the preferred embodiments of the present invention are directed to a generator system configured to convert kinetic energy from a fluid flow into electricity. Unlike prior art systems, the generator system of the preferred embodiments includes counter-rotating rotor and stator assemblies. The use of counter-rotating rotor and stator assemblies increases the output of the generator system compared to systems in which the stator assembly remains stationary. Particularly preferred embodiments include generator systems that are optimized for use in an underwater application in which the generator systems are drive by fluid currents and in an automotive application in which the generator is driven as the automobile moves through air. Highly preferred embodiments include underwater generator systems that include positional control systems designed to optimize the position of the generator system within a fluid stream to maximize energy capture.

Figure 1:
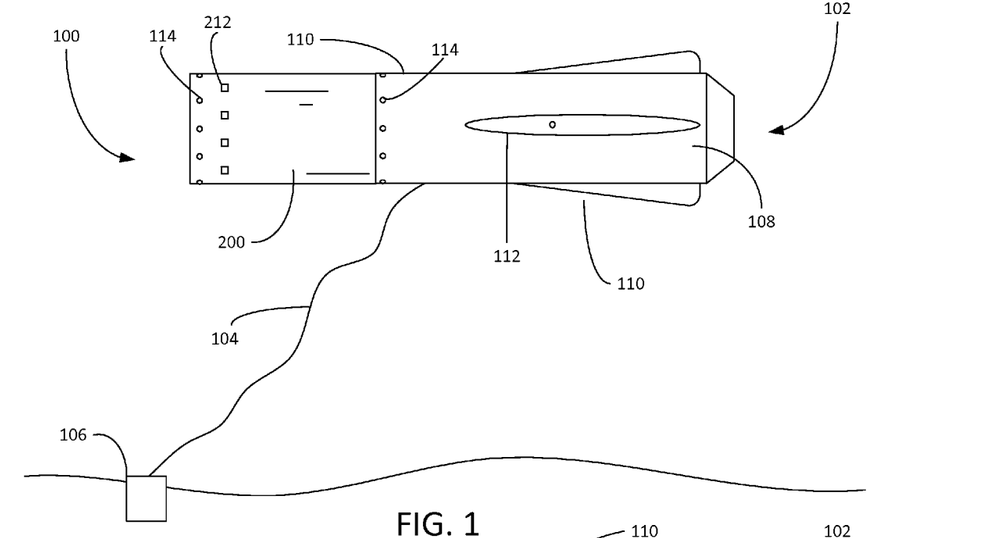
FIG. 1 provides a side view of a generator system constructed in accordance with a preferred embodiment.

Turning to FIG. 1, shown therein is a side view of a generator system 100 constructed in accordance with a preferred embodiment. Although not so limited, the generator system 100 is depicted in an underwater environment. The generator system 100 may also find utility in gaseous environments, including in the atmosphere and in gas conduits in industrial applications. For example, it may be desirable to install the generator system 100 in exhaust gas conduits to convert a portion of energy expelled from manufacturing facilities into electricity.

Additionally, although the generator system 100 is depicted as being driven by a fluid passing through and around the generator system 100, it will be appreciated that the generator system 100 will also find utility in applications in which the generator system 100 is incorporated within a body moving through a fluid. For example, the generator system 100 can be incorporated into automobiles, boats and airplanes to recover a portion of the energy expended in driving the vehicle through the fluid.

The generator system 100 generally includes a generator 102, an umbilical 104 and an electrical power facility 106. The electrical power facility 106 may include, for example, power lines, batteries, electric grids, motors or other loads or power transmission equipment. The umbilical 104 connects the generator 102 to the power facility 106. In particularly preferred embodiments, the umbilical 104 includes a series of wires and cables that are configured to transfer electricity and control signals to and from the generator 102. The generator 102 optionally includes a throttle control module 200 that is configured to meter the flow of fluid through the generator 102.

Figure 2:
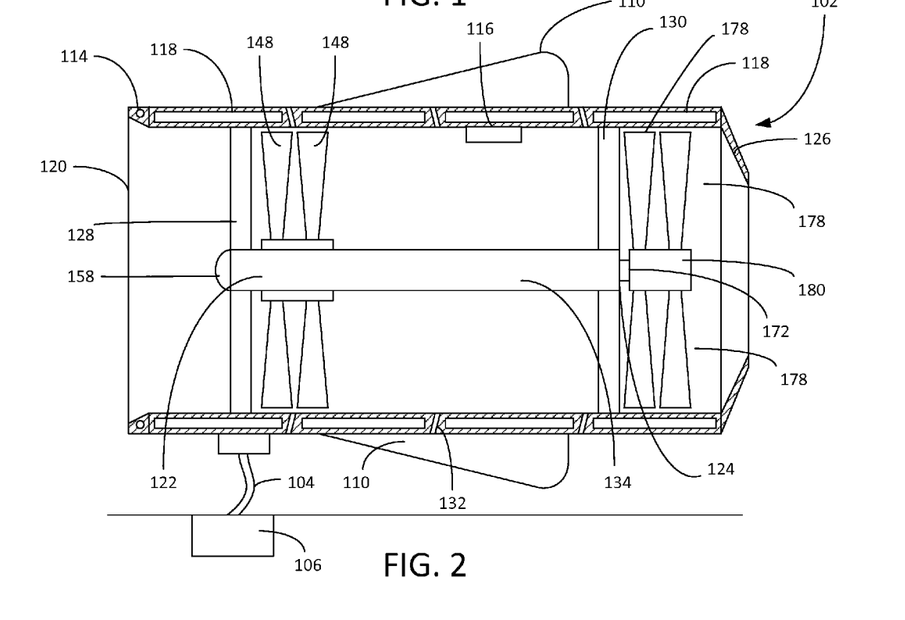
FIG. 2 provides a cross-sectional view of the generator of the generator system of FIG. 1.

Referring now also to the cross-sectional view of FIG. 2, the generator 102 includes a body 108, dorsal fins 110, lateral fins 112 and flow sensors 114. The dorsal fins 110 and lateral fins 112 are control surfaces that are connected to servo motors (not shown). In an underwater environment, the angular disposition of the dorsal fins 110 and lateral fins 112 can be adjusted to control the position of the generator 102 within the fluid stream. The dorsal fins 110 are used to control the yaw of the generator 102, while the lateral fins 112 are used to control the pitch and roll of the generator 102. The dorsal fins 110 and lateral fins 112 are preferably controlled by an onboard computer 116.

In an underwater or air/gas environment, the generator 102 can optionally be provided with buoyancy chambers 118 within the body 108. In a first preferred embodiment, the buoyancy chambers 118 are provided with a fixed volume of air, gas or fluid that is lighter than the external environmental fluid. Preferred gases include helium and helium mixtures. In a second preferred embodiment, the buoyancy chambers 118 are variable and provided with a mechanism for adjusting the buoyancy created by the chambers 118. Adjusting the amount of air within the buoyancy chambers 118 will cause the generator 102 to rise or fall in the water. A suitable variable buoyancy mechanism includes on-board pressured air and gas supplies and pressure-regulated valving to the chambers 118.

Figure 18:
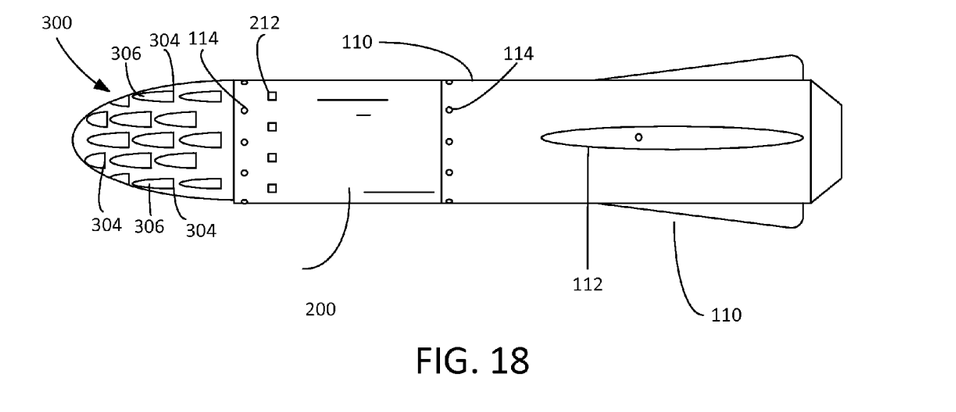
FIG. 18 is a depiction of the generator with a nosecone assembly.
Figure 19:
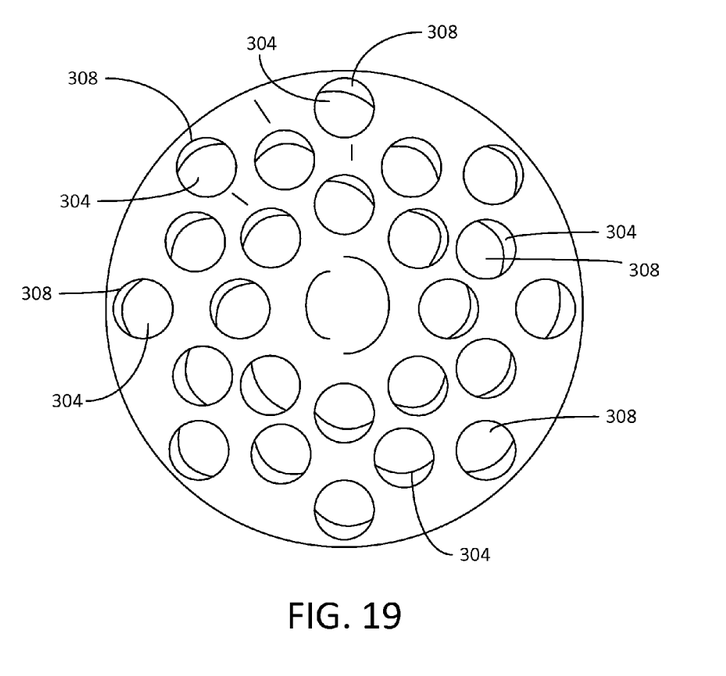
FIG. 19 is a front view of the nose cone assembly of FIG. 18.

The generator 102 may also be fitted with a nose cone assembly 300, as depicted in FIGS. 18 and 19, to prevent large animals and debris from entering the generator 102. The nose cone assembly 300 can be attached in a stationary manner to the upstream side the throttle control module 200 or body 108. The nose cone assembly 300 includes a conical body 302 and plurality of guide ports 304. The guide ports 304 provide a passageway for fluid to pass through the body 302 and enter the throttle control module 200 or body 108. In a particularly preferred embodiment, the guide ports 304 are arranged in a series of longitudinally spaced-apart arrays extending around the circumference of the nose cone body 302. Each guide port 304 may optionally include an intake channel 306 carved out of the nose cone body 302 upstream of the guide port 304. The intake channels 306 assist with funneling fluid into the guide ports 304.

In the preferred embodiments, the aggregate cross-sectional area of the guide ports 304 is equal to or greater than the cross-sectional area of the throttle control module 200 or body 108. In highly preferred embodiments, a plurality of the guide ports 304 include a downstream flap 308 that is configured to deflect fluid moving through the guide port 304 as it passes through the nose cone body 302. The downstream flap 308 preferably induces a rotation in the fluid as it passes through the nose cone body 302. The rotating fluid increases the efficiency of the generator 102.

In a particularly preferred embodiment, the generator 102 includes the onboard computer 116 that automatically controls the position of the generator 102 within the fluid stream in response to readings from the flow sensors 114. The on-board computer 116 preferably includes gyroscopic azimuth, inclination and pressure sensor input. By evaluating the flow at various depths and in various directions, and the orientation and inclination of the generator 102, the onboard computer 116 can position the generator 102 at an optimized position within the fluid stream by adjusting the dorsal fins 110, lateral fins 112 and buoyancy of the generator 102. In an alternate preferred embodiment, the onboard computer 116 is located in the power facility 106 or from another remote location in wired or wireless connection with the generator 102.

Continuing with FIG. 2, the generator 102 further includes an intake 120, a stator assembly 122, a rotor assembly 124 and a discharge 126. Generally, fluid enters the generator through the intake 120, passes through the stator assembly 122, into the rotor assembly 124 and out of the generator 102 through the discharge 126. The generator further includes an upstream support strut 128, a downstream support strut 130 and a plurality of pressure ports 132. The upstream and downstream support struts 128, 130 support the stator and rotor assemblies 122, 124 within the body 108. The pressure ports 132 equalize the internal pressure of the generator 100 with the external pressure in the fluid stream. In a particularly preferred embodiment, the discharge 126 includes a taper that produces a venturi-type education of fluid through the generator 102.

Figure 3:
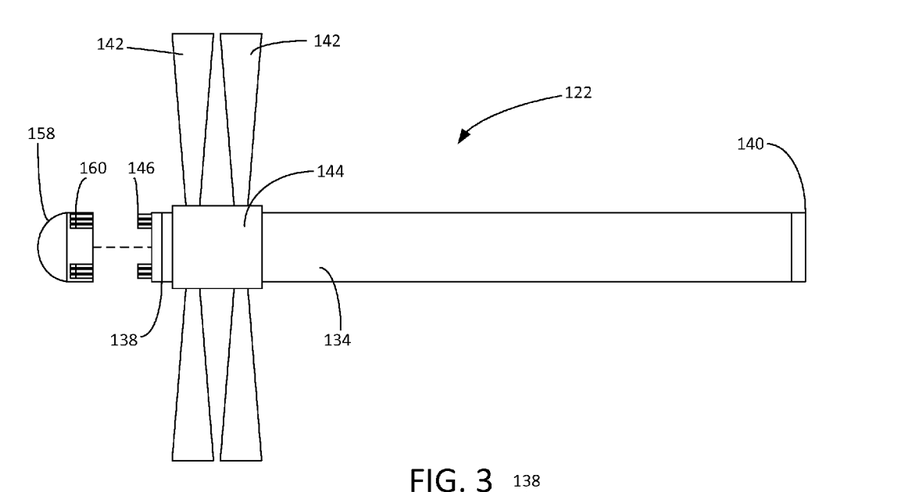
FIG. 3 provides a side view of the stator assembly and transfer hub.
Figure 4:
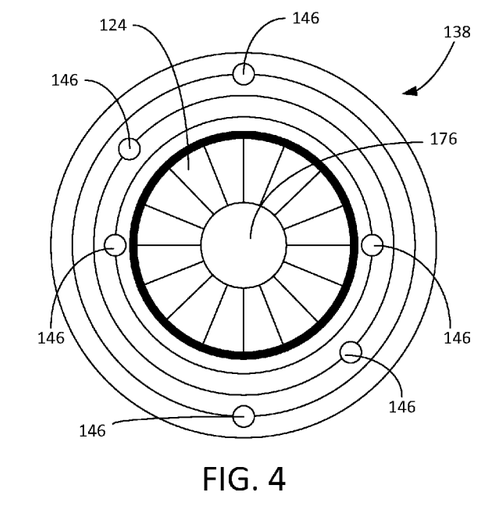
FIG. 4 provides an end view of the body of the stator assembly.
Figure 5:
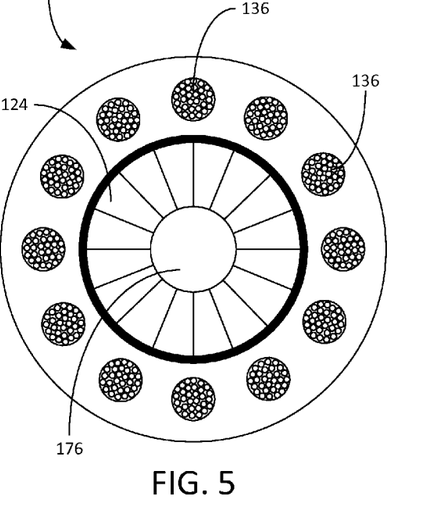
FIG. 5 provides a cross-sectional view of the body of the stator assembly.

Turning to FIGS. 3-5, shown therein are depictions of the stator assembly 122. The stator assembly 122 preferably includes a stator core 134, stator windings 136, stator upstream end cap 138, stator downstream end cap 140, stator turbines 142, and stator turbine collar 144. The stator core 134 is preferably constructed from a fluid-impermeable, electrically insulating material. Suitable materials include ceramics and certain plastics. The stator windings 136 are passed through the stator core 134 in a series of loops. In the particularly preferred embodiment depicted in FIG. 5, the stator assembly 122 includes twelve (12) sets of stator windings 136 separated into three (3) phases 136a, 136b and 136c. Each of the phases of the stator windings 136 is connected to a corresponding pair of phase lugs 146a, 146b and 146c that extend through the stator upstream end cap 138. The phase lugs 146a, 146b and 146c are used to place the stator assembly 122 in electrical communication with the downstream power facility 106.

The stator assembly 122 is configured for rotation within the body 108 of the generator 102. Rotation of the stator assembly 122 is accomplished through the use of the stator turbines 142. The stator turbines 142 are connected to the stator core 134 through the stator turbine collar 144. The turbine collar 144 offsets the loads presented by the stator turbines 142 to the stator core 134. Although two stator turbines 142 are shown in FIG. 5, it will be appreciated that greater or fewer turbines 142 may be employed as necessary.

Figure 12:
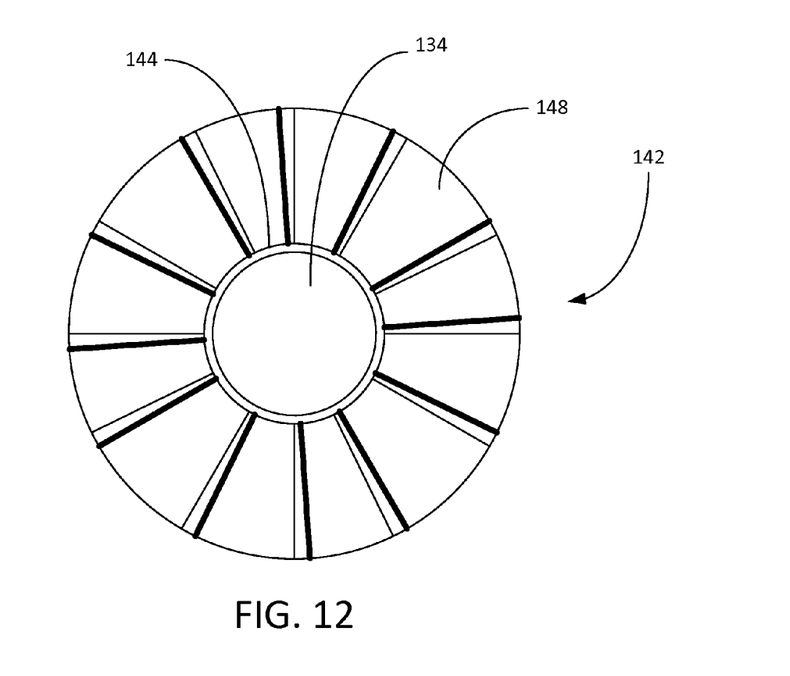
FIG. 12 provides a downstream view of a stator blade assembly.

In a particularly preferred embodiment, the stator assembly 122 includes a pair of stator turbines 142. As depicted in FIG. 12, each stator turbine 142 preferably includes eleven (11) stator turbine blades 148 that are configured to rotate the stator assembly 122 in a clockwise direction. In a highly preferred embodiment, each stator turbine 142 includes eleven (11) stator turbine blades 148 that each span approximately 27 degrees, include a 45 degree pitch and offer a 5 degree separation between adjacent blades. In the preferred embodiment depicted in FIG. 5, the stator turbines 142 are radially offset by approximately 5 degrees to improve the efficiency of the paired turbine assemblies.

Figure 6:
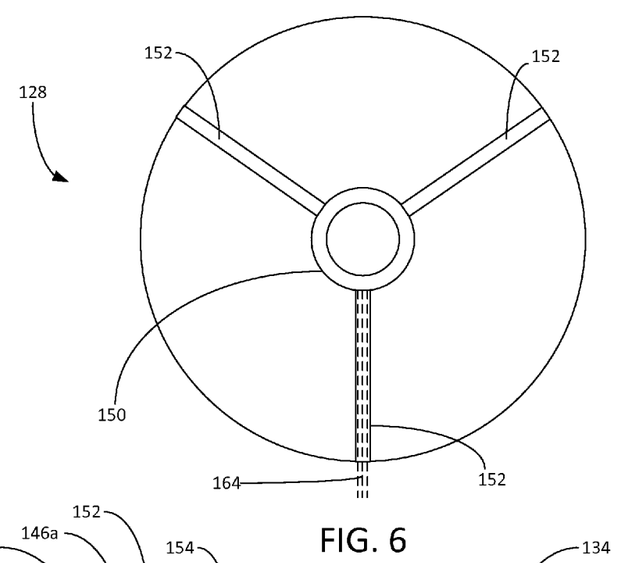
FIG. 6 provides an end view of the upstream support strut.
Figure 7:
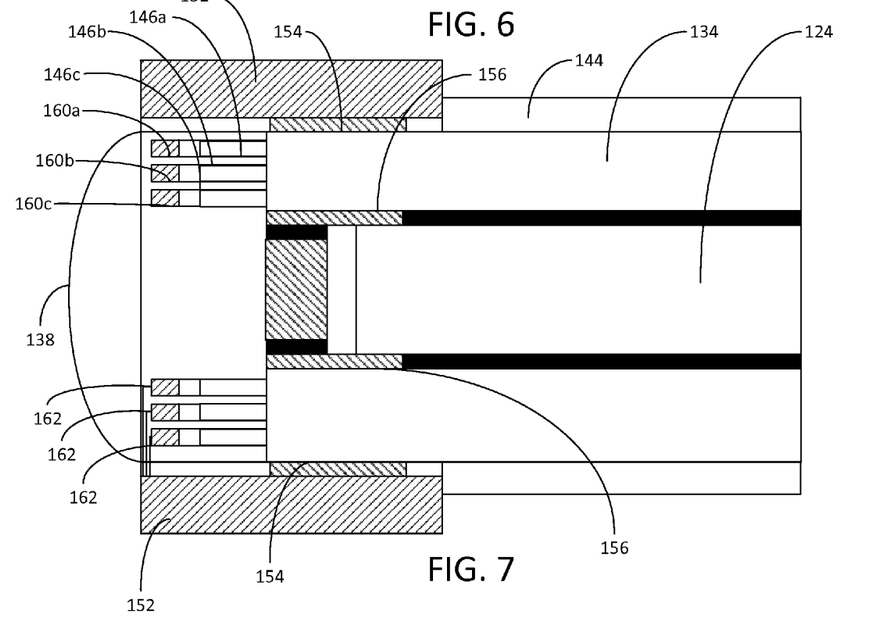
FIG. 7 provides a cross-sectional view of the upstream support strut.

Turning to FIGS. 6 and 7, shown therein are front and side cross-sectional views of the upstream support strut 128. The support strut 128 includes a central hub 150 and a plurality of braces 152 extending from the hub 150 to the body 108. The upstream support strut 128 centers the upstream ends of the rotor and stator assemblies, 124, 122 and provides a conduit for wiring from the stator assembly 122. The upstream support strut 128 includes upstream stator bearings 154 and upstream rotor bearings 156 that allow the stator assembly 122 and rotor assembly 124 to each turn independently within the upstream support strut 128. The upstream stator bearings 154 and upstream rotor bearings 156 may be include fluid-based hydrodynamic bearings or sealed ball bearings. It will be appreciated that the upstream stator bearings 154 and upstream rotor bearings 156 provide an offset to longitudinal and lateral thrusts generated by the stator and rotor assemblies, 122, 124.

Referring now also to FIG. 3, the upstream support strut 128 also includes a transfer hub 158. The transfer hub 158 is configured to remain stationary within the upstream support strut 128 and to engage the stator upstream end cap 138. As noted in FIGS. 3 and 4, the stator upstream support cap 138 includes the projecting phase lugs 146. The transfer hub 158 includes a series of transfer hub races 160 that are configured to receive the phase lugs 146 from the stator assembly 122. Each of the transfer hub races 160 includes an electrically conductive socket 162 that is connected to a transfer cable 164. The transfer cable 164 is routed through on or more of the braces 152 of the upstream support strut 128 and conducts electricity away from the stator assembly 122 to the umbilical 104.

Each of the transfer hub races 160 is concentrically located inside the transfer hub 158 to correspond to the radial position of the corresponding phase lugs 146. For example, phase lugs 146a, which correspond to stator winding 136a, are placed on an exterior portion of the stator upstream end cap 138 and correspond to an exterior transfer hub race 160a. Similarly, phase lugs 146b, 146c are configured to engage transfer hub races 160b, 160c, respectively. The phase lugs 146 may optionally include spring-loaded brushes to ensure consistent electrical contact between the phase lugs 146 and the conductive sockets 162 of the transfer hub 158.

Figure 8:
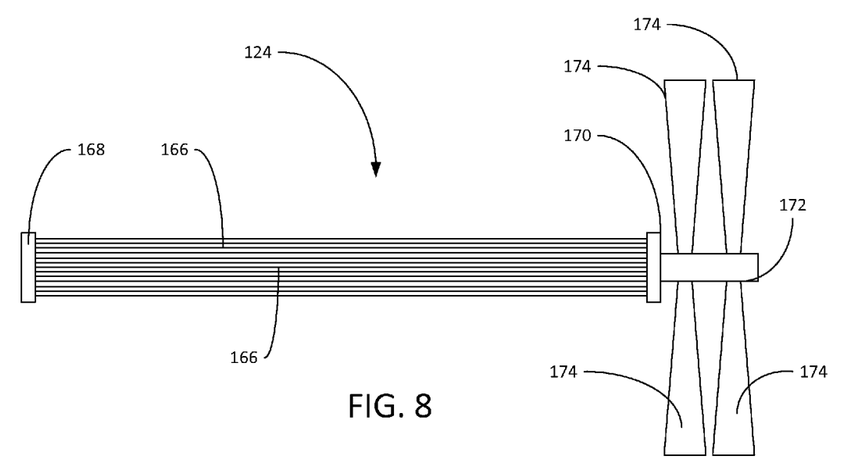
FIG. 8 provides a side view of the rotor assembly.
Figures 9, 10:
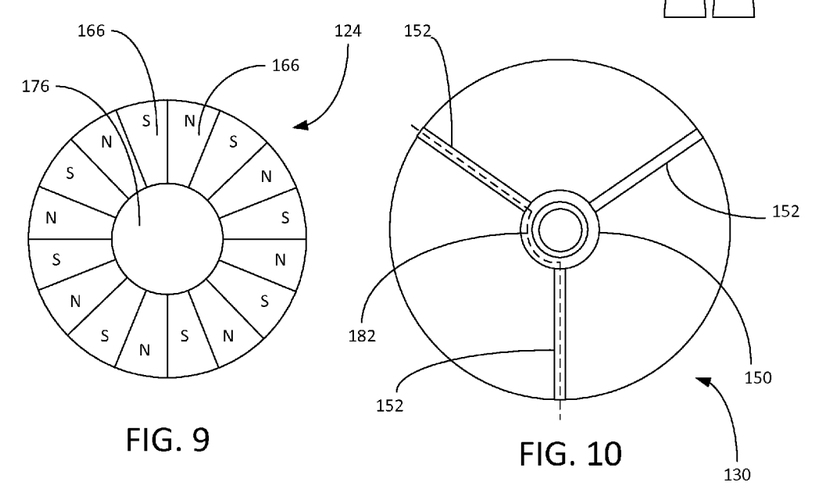
FIG. 9 provides an end view of the rotor assembly.
FIG. 10 provides an end view of the downstream support strut.

Turning to FIGS. 8-9, shown therein are side and upstream ends, respectively, of the rotor assembly 124. The rotor assembly 124 includes a series of longitudinally-extending permanent magnets 166, a rotor upstream end cap 168, a rotor downstream end cap 170, a turbine shaft 172 and one or more rotor turbines 174. The magnets 166 are preferably arranged in alternating order of North-South poles (as indicated in FIG. 9). In a particularly preferred embodiment, the magnets 166 are N54 neodymium bar magnets with longitudinal polarity. Each of the magnets 166 is preferably attached to a rotor shaft 176, which is constructed from a magnetically conductive material. In highly preferred embodiments, each of the permanent magnets 166 extends around the rotor shaft 176 for 22.5 degrees.

The rotor assembly 124 is configured for rotation within the center of the stator assembly 122. Rotation of the rotor assembly 124 is accomplished through the use of the rotor turbines 174. The rotor turbines 174 are connected to the turbine shaft 172, which is in turn connected to the rotor shaft 176. Although two rotor turbines 174 are shown in FIG. 8, it will be appreciated that greater or fewer turbines 174 may be employed as necessary.

Figure 11:
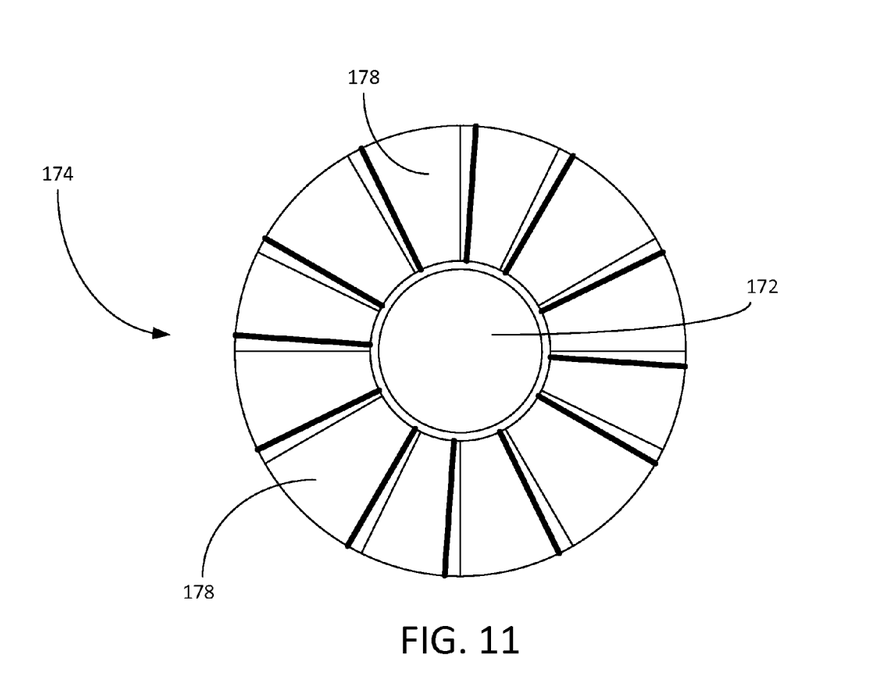
FIG. 11 provides a downstream view of a rotor blade assembly.

In a particularly preferred embodiment, the rotor assembly 124 includes a pair of rotor turbines 174. As depicted in FIG. 11, each rotor turbine 174 preferably includes eleven (11) rotor turbine blades 178 that are configured to rotate the rotor assembly 124 in a counter-clockwise direction. In a highly preferred embodiment, each rotor turbine 174 includes eleven (11) rotor turbine blades 178 that each span approximately 27 degrees, include a 45 degree pitch and offer a 5 degree separation between adjacent blades. In the preferred embodiment depicted in FIG. 8, the rotor turbines 174 are radially offset by approximately 5 degrees to improve the efficiency of the paired turbine assemblies. As noted in FIG. 2, the rotor assembly 124 may optionally include a rotor turbine collar 180 to secure the rotor turbine blades 178 to the turbine shaft 172. It will be appreciated that the counter-rotation of the stator turbines 142 and rotor turbines 174 significantly reduces or eliminates torsional forces generated by the rotating components within the generator 102, which permits the use of a flexible umbilical 104.

Turning to FIG. 10, shown therein is the downstream support strut 130. The downstream support strut 130 is designed to center the stator and rotor assemblies 122, 124 within the body 108. The downstream support strut 130 preferably includes a central hub 150 and braces 152. The downstream support strut 130 may optionally include a series of thrust bearings as illustrated and described in connection with the upstream support strut 128.

In addition to the load resistive and centering functions, the downstream support strut 130 may also be used to provide a path for electrical connections extending across the body 108 of the generator 100. For example, it may be advantageous to provide the downstream support strut 130 with a guidance control cable 182 that provides signals from the flow sensors 114 distributed around the generator 100 to the onboard computer 116.

Figure 13:
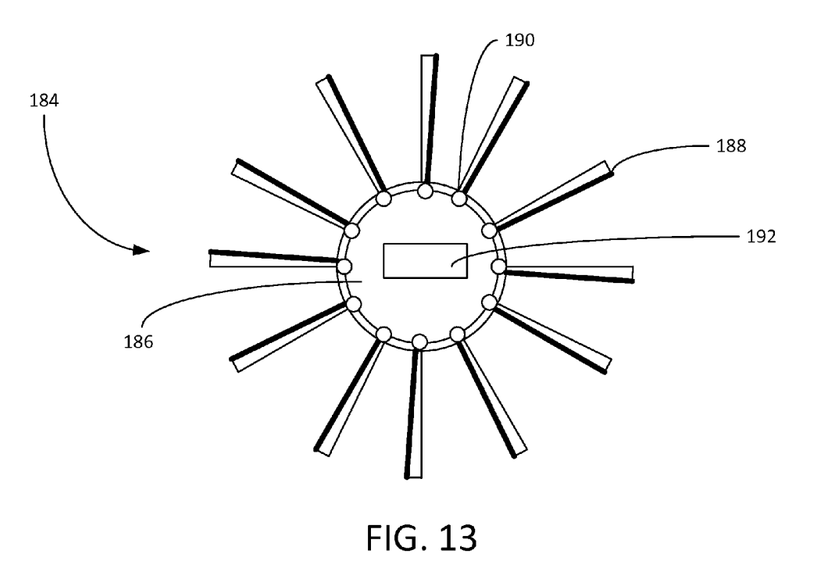
FIG. 13 provides a downstream view of a variable pitch blade assembly in a first position.
Figure 14:
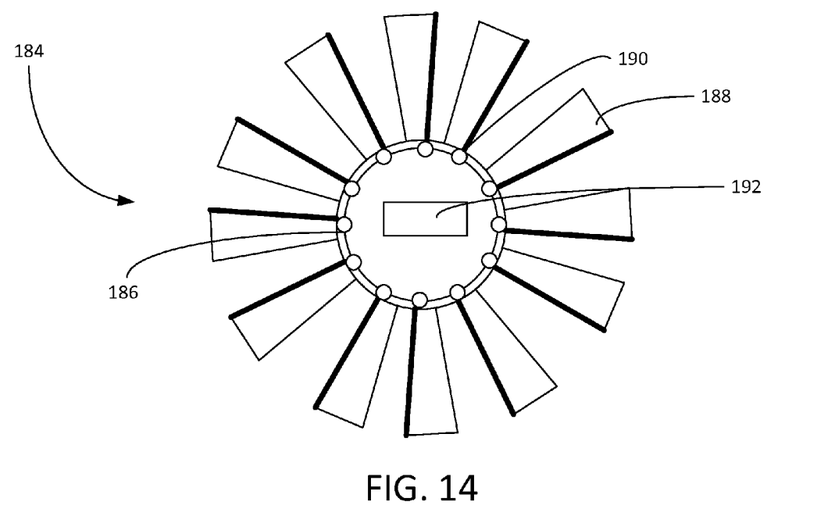
FIG. 14 provides a downstream view of a variable pitch blade assembly in a second position.

Turning to FIGS. 13 and 14, shown therein is an alternate preferred embodiment in which the rotor and stator turbines 174, 142 are provided as variable-pitch turbines 184. The use of variable-pitch turbines provides the ability to precisely control the rotational speed of the rotor and stator assemblies 124, 122. It will be understood that the depiction of the variable-pitch turbines 184 in FIGS. 13 and 14 is merely exemplary and that the variable pitch turbines 184 are configured to rotate in opposite directions when used as the stator turbines 142 and rotor turbines 174.

Each variable-pitch turbine 184 includes a variable-pitch hub 186 and a plurality of variable-pitch vanes 188. Each of the plurality of variable-pitch vanes 188 is connected to the variable-pitch hub 186 with a pivot 190 to enable each of the variable-pitch vanes 188 to rotate on an axis perpendicular to the rotational axis of the variable-pitch turbine 184. In FIG. 13, each of the variable-pitch vanes 188 has been rotated to a "low-profile" position that is well-suited for high-speed, low-torque situations. In contrast, FIG. 14 presents the variable-pitch vanes 188 in a higher-profile position in which the variable-pitch turbine 184 will produce increased torque at lower rotational speeds.

The rotational position of each of the variable-pitch vanes 188 is controlled with servo motors 190 and a power source 192. In a particularly preferred embodiment, the servo motors 190 are two-way hydraulic motors and the power source 192 provides a switchable source of hydraulic pressure to the servo motors 190. By adjusting the pressure and direction of fluid flow from the power source 192, the direction and extent of rotation of each of the variable-pitch vanes 188 can be controlled. Alternatively, the servo motors 190 can be electric and the power source 192 a source of electric current. In highly preferred embodiments, the onboard computer 116 controls the variable pitch turbines 184 to optimize the performance of the generator 102.

Figure 15:
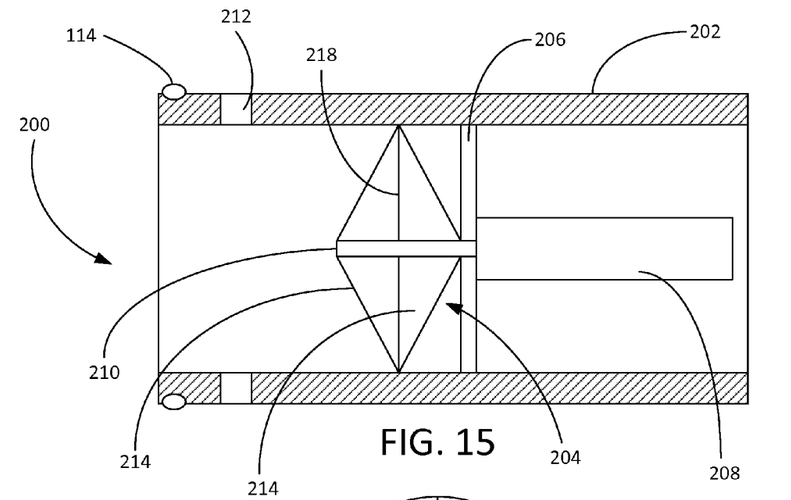
FIG. 15 provides a side cross-sectional view of the throttle control module with an umbrella bladder in a first position.
Figure 16:
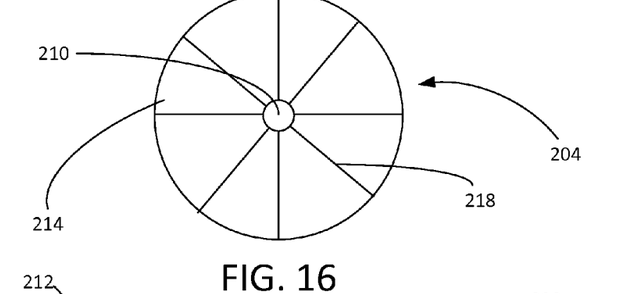
FIG. 16 provides a downstream view of the umbrella bladder of FIG. 15.
Figure 17:
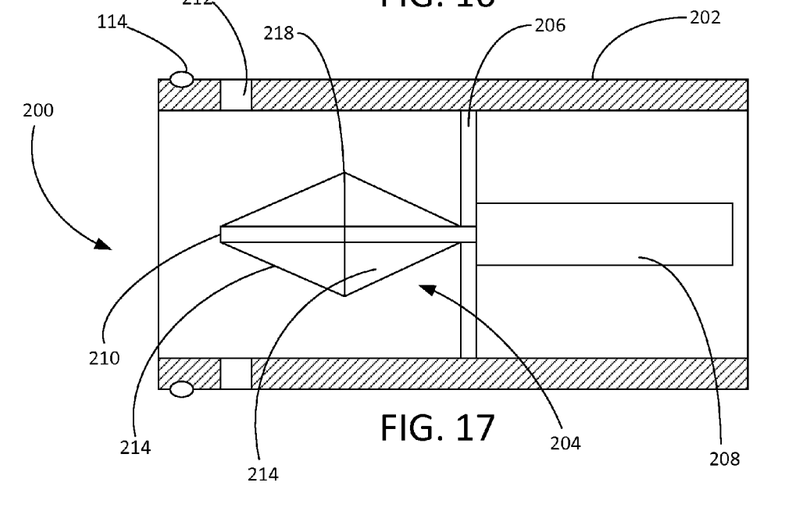
FIG. 17 provides a cross-sectional view of the throttle control module with the umbrella bladder in a second position.

Turning to FIGS. 15-17, shown therein is the optional throttle control module 200. The throttle control module 200 includes a cylindrical housing 202 that is preferably substantially the same diameter of the body 108 of the generator 102. The throttle control module 200 is preferably secured to the upstream side of the generator 102.

The throttle control module 200 further includes an umbrella bladder 204, a throttle strut 206, a hydraulic cylinder 208, a hydraulic piston 210 and one or more exhaust ports 212. The throttle strut 206 extends across the housing 202 and centers the hydraulic piston 210, hydraulic cylinder 208 and umbrella bladder 204 within the housing 202. The throttle control module 200 preferably includes a plurality of flow sensors 114 positioned on the upstream portion of the housing 202. The flow sensors 114 are configured to measure flow entering the throttle control module 200 on a differential basis around the circumference of the throttle control module 200 and to separately output signals to the onboard computer 116 representative of the measured flow.

The umbrella bladder 204 includes an upstream face 214, a downstream face 216 and braces 218. The upstream face 214 and downstream face 216 are preferably manufactured from a durable, flexible material supported by metal braces 218. Suitable materials of manufacture include polymers, wear-resistant and waterproof fabrics, and thin metal foils. The upstream face 214 and downstream face 216 are connected by hinged or jointed connections around the periphery of each face 214, 216. The upstream face 214 and downstream 216 are also connected by hinged or jointed connections at the center of each face. This permits the upstream face 214 and downstream face 216 to elongate into an open position (FIG. 17) or retract into a closed position (FIG. 15).

The movement and position of the umbrella bladder 204 is controlled by movement of the piston 210. The upstream face 214 is secured to the distal end of the piston 210 and the downstream face 216 is secured to the throttle strut 206. As the piston 210 deploys, it carries the center of the upstream face 214 away from the downstream face 216, thereby reducing the diameter of the umbrella bladder 204. As the piston 210 retracts, the upstream face 214 is brought together with the downstream face 216 to increase the diameter of the umbrella bladder 204. Thus, but controlling the position of the piston 210, the umbrella bladder 204 can be made to obstruct or permit the flow of fluid through the throttle control module 200. In particularly preferred embodiments, the operation of the throttle control module 200 is controlled by the onboard computer 216 to optimize the production from the generator 102.

It will be understood that preferred embodiments include the use of the throttle control module 200 alone or in connection with the variable pitch-turbines 184. Similarly, it may be desirable to employ the variable-pitch turbines 184 with or without the use of the throttle control module 200. For example, in applications in which the local environment is well-known and nominally variable, the use of variable-pitch turbines 184 and the throttle control module 200 may be unnecessary. In situations where the local environment is well-known, but at least moderately variable, it may be desirable to use only the variable-pitch turbines 184. In cases where the installation environment is unknown and potentially variable, it is recommended that the generator system 100 include both variable-pitch turbines 184 and the throttle control module 200.

Figure 20:
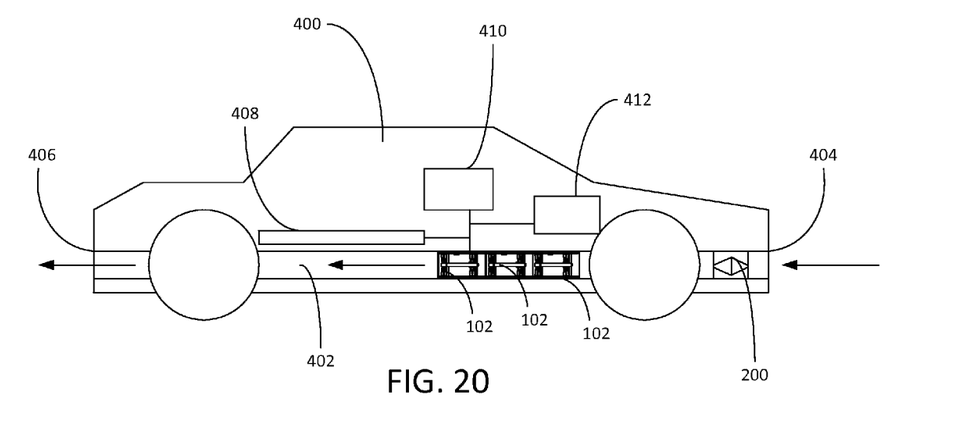
FIG. 20 is a side view of the incorporation of the generator system into an automobile.
Figure 21:
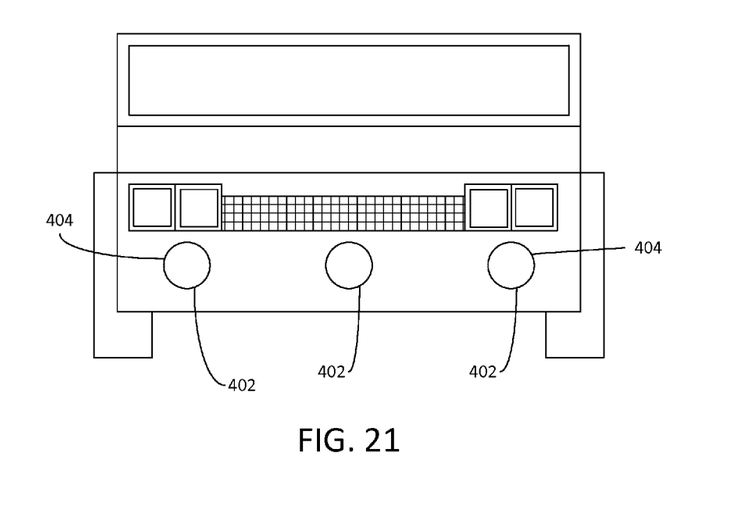
FIG. 21 is a front view of the automotive embodiment of FIG. 20.

Turning to FIGS. 20 and 21, shown therein are side and front views, respectively, of an application of the generator 102 embodied within an automobile 400. The automobile 400 includes a plurality of air ducts 402 that extend from an intake end 404 to a discharge end 406. In the preferred embodiment depicted in FIGS. 20 and 21, three air ducts 402 extend from the front of the automobile 400 to the back of the automobile 400. It will be appreciated, however, that the air ducts 402 could be routed through other portions of the automobile 400. In preferred embodiments, the air ducts 402 are installed such that the air ducts 402 do not increase drag on the automobile 400.

One or more generators 102 are placed within the air ducts 402. As air passes through the air ducts 402, the generators 102 produce electricity, which can be used to charge a battery 408, provide power to electrical accessories in the automobile 400 or to directly power an electrical motor. Each air duct 402 may optionally be provisioned with the throttle control module 200. When the throttle control module 200 is closed, the automobile 400 will behave aerodynamically as if air duct 402 was not present. When the throttle control module 200 is opened, the generators 102 are activated and begin to produce electricity in response to the movement of air through the air ducts 402. In this way, the throttle control modules 200 can be selectively operated to open and close at desired times during the operation of the automobile 400. For example, it may be desirable to open the throttle control modules 200 during a braking operation.

Figure 22:
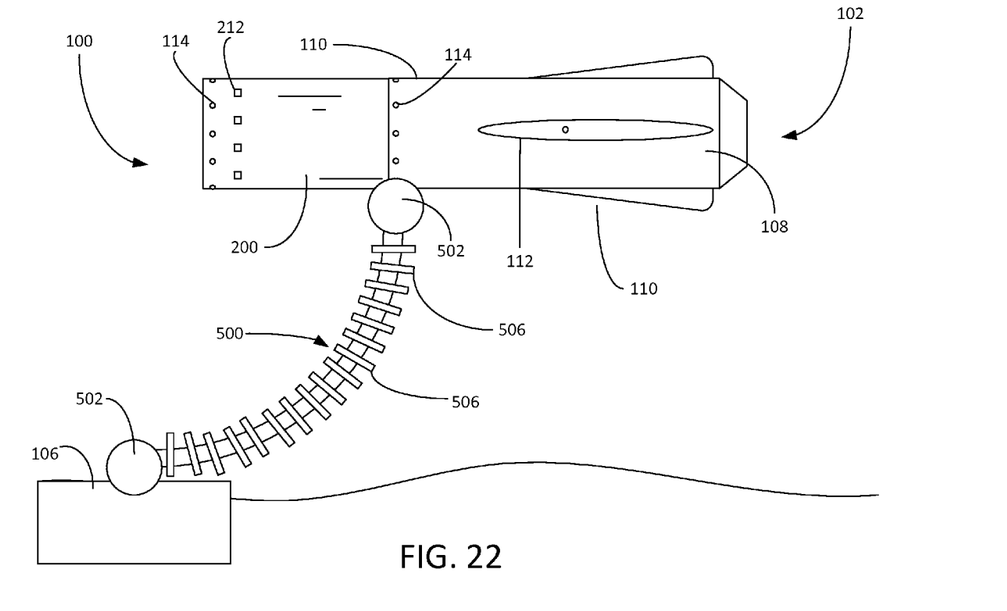
FIG. 22 is a side depiction of the generator system constructed in accordance with an alternate preferred embodiment that includes a pressure-sensing umbilical.

Turning to FIG. 22, shown therein is a depiction of an alternate embodiment of the generator system 100. In the alternate embodiment depicted in FIG. 22, the generator 102 is tethered to the power facility 106 with a pressure-sensing umbilical 500. The generator 102 is preferably connected to the pressure-sensing umbilical 500 with an inclination azimuth gimbaled connector 502. A second inclination azimuth gimbaled connector 502 is used to connect the pressure-sensing umbilical to the power facility 106. In this way, the pressure-sensing umbilical 500 and generator 102 are provided a significant degree of angular and rotational freedom of movement.

Figure 23:
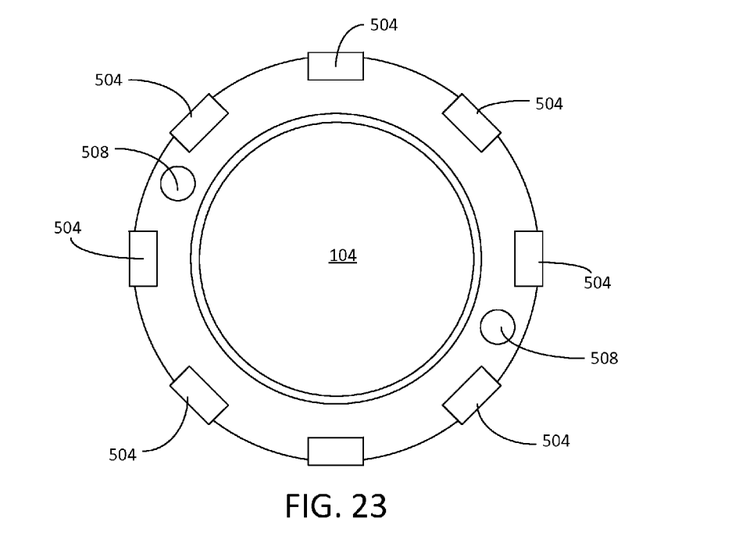
FIG. 23 is a cross-sectional view of the pressure-sensing umbilical of FIG. 22.

The pressure-sensing umbilical 500 includes a plurality of pressure sensors 502 disposed within collars 504 along the length of the pressure-sensing umbilical 500. As illustrate in the cross-sectional view of FIG. 23, the pressure sensors 502 are preferably disposed at various points around the circumference of the pressure-sensing umbilical 500. In this way, a distributed network of pressure sensors 502 is configured to detect areas of higher pressure exerted against the pressure-sensing umbilical 500. Signal outputs from the pressure sensors 502 are conveyed along data lines 508 or other transmission mechanisms to the power facility 106 and generator 102. Using this information, the power facility 106 and generator 102 can use on-board guidance systems to adjust the position of the generator 102 within the fluid stream. Thus, determining which side of the pressure-sensing umbilical 500 is exposed to the greatest fluid pressure is useful in orienting the generator 102 such that it is oriented at an optimal disposition and location within the fluid stream. In a particularly preferred embodiment, the generator 102 automatically adjusts its position in the fluid stream to optimize the generation of electricity based on information from the pressure-sensing umbilical 500.

Once the generator has been positioned within a desired portion of the fluid stream, the flow sensors 114 on the generator 102 can be used to further optimize the position of the generator 102 within the fluid stream. The data produced by the flow sensors 114 can be interpreted by on-board guidance computers and used to automatically adjust the position of the generator 102. In this way, the data produced by the flow sensors 114 and used by the on-board guidance computers provides a second autonomous process for optimizing the performance of the generator 102.

Figure 24:
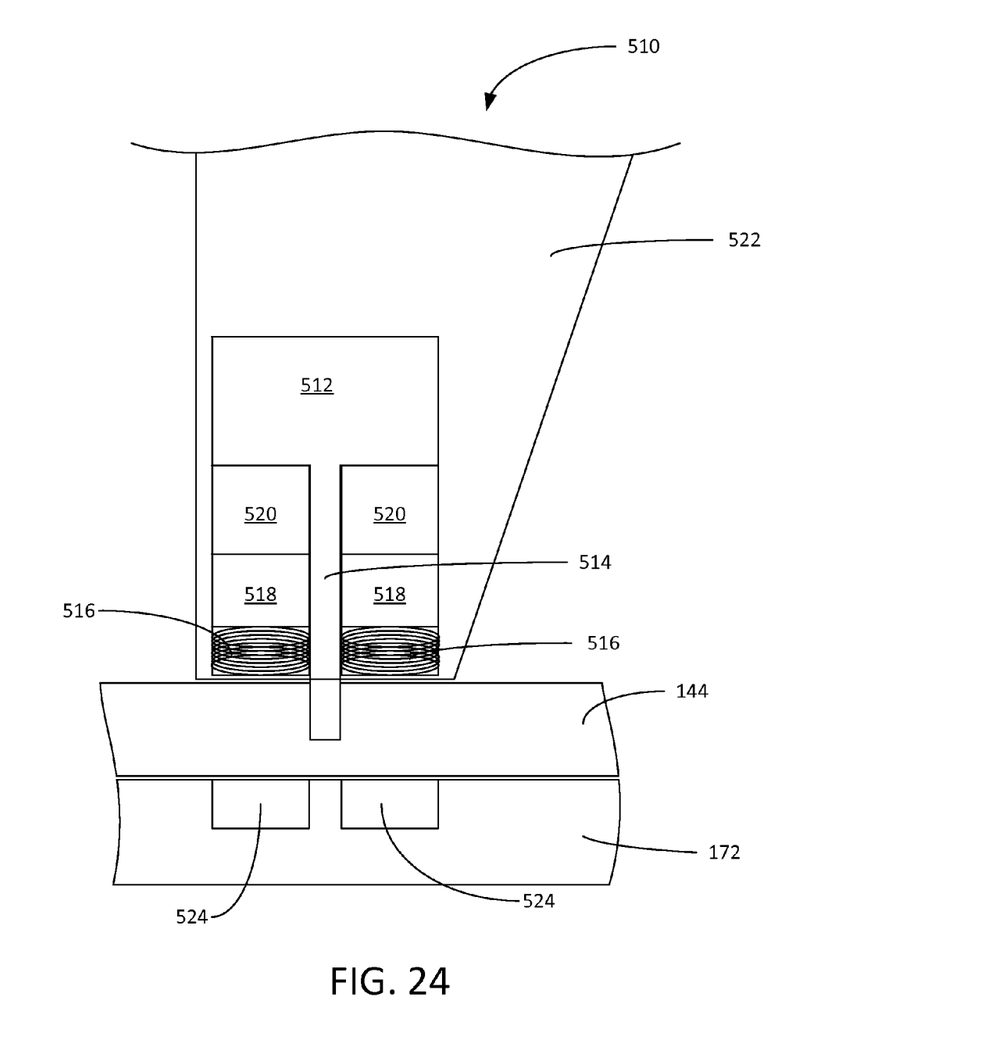
FIG. 24 is a partial cross-sectional view of an electronic variable pitch blade assembly.

To further refine the performance of the generator 102, the generator 102 may optionally be fitted with electronic variable pitch blades 510, as depicted in FIG. 24. The electronic variable pitch blades 510 are used to automatically control the pitch of the stator turbine blades 148 and the rotor turbine blades 178. Although FIG. 24 depicts electronic variable pitch blades 510 connected to the stator turbine collar 144, it will be appreciated that the electronic variable pitch blades 510 can also be used within the rotor assembly 124. Unless otherwise specified, the construction and operation of the electronic variable pitch blades 510 within the rotor assembly 124 is the same as within the stator assembly 122.

The electronic variable pitch blades 510 include a servo motor 512. a pivot shaft 514, induction coils 516, a rectifier 518, a position control switch 520 and a blade 522. The servo motor 512, induction coils 516, rectifier 518 and position control switch 520 are preferably secured inside, or to the exterior of, the blade 522. The pivot shaft 514 is secured to the stator turbine collar 144 and to the servo motor 512, such that when the servo motor 512 is energized, it rotates the blade 522 about the fixed pivot shaft 514.

Power to operate the electronic variable pitch blades 510 is generated by the induction coils 516 as they pass over a micro induction magnet ring 524. In the embodiment depicted in FIG. 24, the micro induction magnet ring 524 is located in the turbine shaft 172. When the electronic variable pitch blades 510 are used in the rotor assembly 124, the induction coils 516 and micro induction magnet ring 524 can be positioned such that the rotation of the blades 522 causes rotational movement between the induction magnet ring 524 and the induction coils 516.

Power generated by the induction coils 516 is passed to the rectifier 518 where it is converted to direct current. The direct current is then applied to the position control switch 520, which then drives the servo motor 512. In preferred embodiments, the position control switch 520 is programmed to incrementally move the servo motor 512 and then determine if the change in the pitch of the blade 122 improved the performance of the generator 102. The determination can be made indirectly by evaluating the power generated by the generator 102, or directly by observing whether the change in blade 122 position changed the current induced from the induction coils 516. Thus, the electronic variable pitch blades 510 permit an autonomous control system that can be configured to constantly adjust the pitch of the blades 522 to find the instantaneous optimal position for each individual blade 522 as it rotates.

In some preferred embodiments, each electronic variable pitch blade 510 is separately adjusted so that the effects from the adjustment to a first electronic variable pitch blade 510 are not misinterpreted as an effect caused by a second electronic variable pitch blade 510. In a presently preferred control scheme, each of the electronic variable pitch blades 510 is adjusted separately in sequence with each of the individual electronic variable pitch blades 510 being adjusted several times during a single rotation. The ability to separately and automatically control the pitch of the electronic variable pitch blades 510 within a single rotation of the stator assembly 122 or rotor assembly 124 makes possible the optimization of the generator 102 when exposed to internal or external eddy currents, variations in flow and other environmental variables.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed herein. It may be desirable to combine various aspects of the preferred embodiments in combinations not expressly disclosed herein. As an example, it may be desirable to implement one or more generators 102 within an automobile 400 that incorporate electronic variable pitch blades 510. The electronic variable pitch blades 510 may be controlled with an autonomous optimization scheme discussed above, or in response to power consumption inputs provided by a charge or motor control system within the automobile 400. The externally-directed control system adjusts the operation of the electronic variable pitch blades 510 to produce additional electricity during high demand (e.g., during or after an acceleration) and to reduce the drag created by the generators 102 during periods of low demand (e.g., once the batteries are fully charged or when the electric motor is not under load).

It is claimed:
1. A fluid-driven electricity generator comprising:
a stator assembly; wherein the stator assembly comprises:
a stator core that includes a plurality of stator windings; and
one or more stator turbines connected to the stator core, wherein the one or more stator turbines are configured to rotate in a first direction;
a rotor assembly, wherein the rotor assembly comprises:
a plurality of permanent magnets, wherein the plurality of permanent magnets are substantially surrounded by the stator core; and
one or more rotor turbines connected to the plurality of permanent magnets, wherein the one or more rotor turbines are configured to rotate in a second direction that is opposite the first direction, and
a nosecone assembly, wherein the nosecone assembly comprises:
a nose cone body; and
a plurality of guide ports extending through the nose cone body, wherein the plurality of guide ports each further comprises a flap that redirects fluid passing through the guide port to induce rotation in the fluid.

2. The generator of claim 1, wherein the stator assembly further comprises one or more electronic variable pitch blades.

3. The generator of claim 2, wherein each of the one or more electronic variable pitch blades within the stator assembly comprises:
an electric servo motor; and
an induction coil.

4. The generator of claim 3, wherein the rotor assembly further comprises a magnetic ring in proximity with the induction coil of the stator assembly, wherein the passage of the induction coil in proximity with the magnetic ring generates current in the induction coils.

5. The generator of claim 4, wherein each of the one or more electronic variable pitch blades within the stator assembly further comprises:
a rectifier;
a position control switch; and
a blade, wherein the rectifier, position control switch and servo motor are contained within the blade.

6. The generator of claim 2, wherein the rotor assembly further comprises one or more electronic variable pitch blades.

7. The generator of claim 6, wherein each of the one or more electronic variable pitch blades in the rotor assembly comprises:
an electric servo motor; and
an induction coil.

8. The generator of claim 7, wherein the stator assembly further comprises a magnetic ring in proximity with the induction coil of the rotor assembly, wherein the passage of the induction coil in proximity with the magnetic ring generates current in the induction coils.

9. The generator of claim 8, wherein each of the one or more electronic variable pitch blades within the stator assembly further comprises:
a rectifier;
a position control switch; and
a blade, wherein the rectifier, position control switch and servo motor are contained within the blade.

10. An electrical generator system for use in an automobile, the generator system comprising:
one or more air ducts extending through a portion of the automobile;
a throttle control module within each of the one or more air ducts, wherein each of the throttle control modules comprises:
a housing; and
an umbrella bladder that is configured to elongate and retract within the housing; and
one or more generators contained within the air ducts.

11. The electrical generator system of claim 10, wherein each of the one or more generators comprises:
a stator assembly; wherein the stator assembly comprises:
a stator core that includes a plurality of stator windings; and
one or more stator turbines connected to the stator core, wherein the one or more stator turbines are configured to rotate in a first direction; and
a rotor assembly, wherein the rotor assembly comprises:
a plurality of permanent magnets, wherein the plurality of permanent magnets are substantially surrounded by the stator core; and
one or more rotor turbines connected to the plurality of permanent magnets, wherein the one or more rotor turbines are configured to rotate in a second direction that is opposite the first direction.

12. The electrical generator system of claim 11, wherein at least one of the stator assembly and rotor assembly includes one or more electronic variable pitch blades.

13. The electrical generator system of claim 12, wherein each of the one or more electronic variable pitch blades comprises:
a rectifier;
a position control switch; and
a blade, wherein the rectifier, position control switch and servo motor are contained within the blade.

14. The electrical generator system of claim 10, wherein the umbrella bladder comprises an upstream face, a downstream face and a plurality of braces.

15. An underwater electric generator system comprising:
an electric generator, wherein the electric generator is buoyant and wherein the generator comprises:
a stator assembly; wherein the stator assembly comprises:
a stator core that includes a plurality of stator windings; and
one or more stator turbines connected to the stator core, wherein the one or more stator turbines are configured to rotate in a first direction;
a rotor assembly, wherein the rotor assembly comprises:
a plurality of permanent magnets, wherein the plurality of permanent magnets are substantially surrounded by the stator core; and
one or more rotor turbines connected to the plurality of permanent magnets, wherein the one or more rotor turbines are configured to rotate in a second direction that is opposite the first direction; and
wherein at least one of the stator assembly and rotor assembly includes one or more electronic variable pitch blades that comprises:
a rectifier;
a position control switch; and
a blade, wherein the rectifier, position control switch and servo motor are contained within the blade; and
a power facility;
a pressure-sensing umbilical connecting the generator to the power facility.

16. The generator system of claim 15, wherein the pressure-sensing umbilical comprises:
a plurality of pressure sensors configured to detect the direction and depth of maximum fluid flow; and
a data line connected between the plurality of pressure sensors and the generator;
wherein the data lines carry signals representative of the pressures measured by the plurality of pressure sensors.

17. The generator system of claim 15, wherein the generator comprises an on-board guidance system that positions the generator within the fluid stream in response to the measurements from the pressure-sensing umbilical.

18. The generator system of claim 15, wherein the generator further comprises flow sensors and wherein the on-board guidance system is configured to optimize the position of the generator within the fluid stream in response to the outputs from the flow sensors.

\* \* \* \* \*